US008588548B2

(12) United States Patent
Krolczyk et al.

(10) Patent No.: US 8,588,548 B2
(45) Date of Patent: Nov. 19, 2013

(54) METHOD FOR FORMING A COMPOSITE IMAGE

(75) Inventors: Marc Krolczyk, Spencerport, NY (US); John B. Rieger, Webster, NY (US); John V. Nelson, Rochester, NY (US)

(73) Assignee: Kodak Alaris Inc., Rochester, NY (US)

( * ) Notice: Subject to any disclaimer, the term of this patent is extended or adjusted under 35 U.S.C. 154(b) by 582 days.

(21) Appl. No.: 12/845,976

(22) Filed: Jul. 29, 2010

(65) Prior Publication Data
US 2012/0027294 A1    Feb. 2, 2012

(51) Int. Cl.
    *G06K 9/36*    (2006.01)
(52) U.S. Cl.
    USPC ........... 382/284; 382/190; 382/195; 715/764; 715/243
(58) Field of Classification Search
    USPC ...................... 382/190, 195, 203, 284, 305
    See application file for complete search history.

(56) References Cited

U.S. PATENT DOCUMENTS

| | | | |
|---|---|---|---|
| 5,901,245 A | 5/1999 | Warnick et al. | |
| 5,987,164 A * | 11/1999 | Szeliski et al. | 382/154 |
| 6,115,717 A | 9/2000 | Mehrotra et al. | |
| 6,282,317 B1 | 8/2001 | Luo et al. | |
| 6,396,963 B2 * | 5/2002 | Shaffer et al. | 382/305 |
| 6,556,221 B1 * | 4/2003 | Shima et al. | 715/764 |
| 6,711,291 B1 | 3/2004 | Stubler et al. | |
| 6,859,210 B2 | 2/2005 | Luo et al. | |
| 7,000,192 B2 | 2/2006 | Allen et al. | |
| 7,221,395 B2 * | 5/2007 | Kinjo | 348/239 |
| 7,391,917 B2 * | 6/2008 | Ohta et al. | 382/253 |
| 7,711,211 B2 * | 5/2010 | Snowdon et al. | 382/305 |
| 2002/0040375 A1 | 4/2002 | Simon et al. | |
| 2003/0190090 A1 * | 10/2003 | Beeman et al. | 382/284 |
| 2004/0062439 A1 * | 4/2004 | Cahill et al. | 382/173 |
| 2005/0146537 A1 | 7/2005 | Yamakado et al. | |
| 2007/0237421 A1 * | 10/2007 | Luo et al. | 382/284 |
| 2008/0298643 A1 * | 12/2008 | Lawther et al. | 382/118 |
| 2008/0301546 A1 | 12/2008 | Moore et al. | |
| 2010/0287485 A1 * | 11/2010 | Bertolami et al. | 715/764 |
| 2011/0025883 A1 * | 2/2011 | Shkurko et al. | 348/231.2 |
| 2011/0029635 A1 * | 2/2011 | Shkurko et al. | 709/217 |

FOREIGN PATENT DOCUMENTS

| | | |
|---|---|---|
| CA | 2 581 022 | 9/2008 |
| JP | 2005 236372 | 9/2005 |

OTHER PUBLICATIONS

Balasubramanian et al., "A new approach to palette selection for color images" Journal Imaging Technology, vol. 17, pp. 284-290, 1991.
Foley, et al., "Computer Graphics Principles and Practice", Addison-Wesley, Boston, 1996.

(Continued)

*Primary Examiner* — Vu Le
*Assistant Examiner* — Aklilu Woldemariam (57) ABSTRACT

A method for displaying a group of digital images using a background corresponding to an image region selected from one of the digital images, comprising: receiving a designation of the group of digital images to be displayed; using a processor to automatically analyze the group of digital images to select an image region from one of the digital images that is appropriate to use as a background for a composite image, wherein the selected image region includes a plurality of image pixels; forming a background from the selected image region; forming the composite image including the background and at least one digital image from the group of digital images; and displaying the composite image.

22 Claims, 7 Drawing Sheets

(56) References Cited

OTHER PUBLICATIONS

Anil K. Jain, "Algorithms for Clustering Data" Prentice-Hall, Englewood Cliffs, NJ, 1988.

Chevreul, "The Principles of Harmony and Contrast of Colors and Their Applications to the Arts" Schiffer, West Chester, PA, 1987.
Itten, "The Elements of Color", John Wiley & Sons, Germany, 2003.
www.DeGraeve.com, "Color Palette Generator", 1999-2011.

* cited by examiner

METHOD FOR FORMING A COMPOSITE IMAGE

CROSS-REFERENCE TO RELATED APPLICATIONS

Reference is made to commonly assigned, co-pending U.S. patent application Publication No. 2011/0216966, entitled: "Method for combining image and imaging product", by Cok et al., which is incorporated herein by reference.

FIELD OF THE INVENTION

This invention pertains to the field of digital imaging, and more particularly to a method for forming a background for a composite image.

BACKGROUND OF THE INVENTION

The field of digital imaging has been growing rapidly over recent years. Many individuals have large collections of digital images including hundreds, if not thousands, of digital images. Various digital imaging applications and systems have been developed enabling users to view their digital images on soft-copy displays. The digital images can also be used to make prints for displaying in photo albums or in picture frames, or can be used to make various imaging products such as photo calendars, photo books, coffee mugs and the like.

In many applications, it is desirable to form composite images that can be used to simultaneously view a plurality of digital images. For example, such composite images can be used as a page of a photo book or can be used to make a photo calendar.

Figure 1:
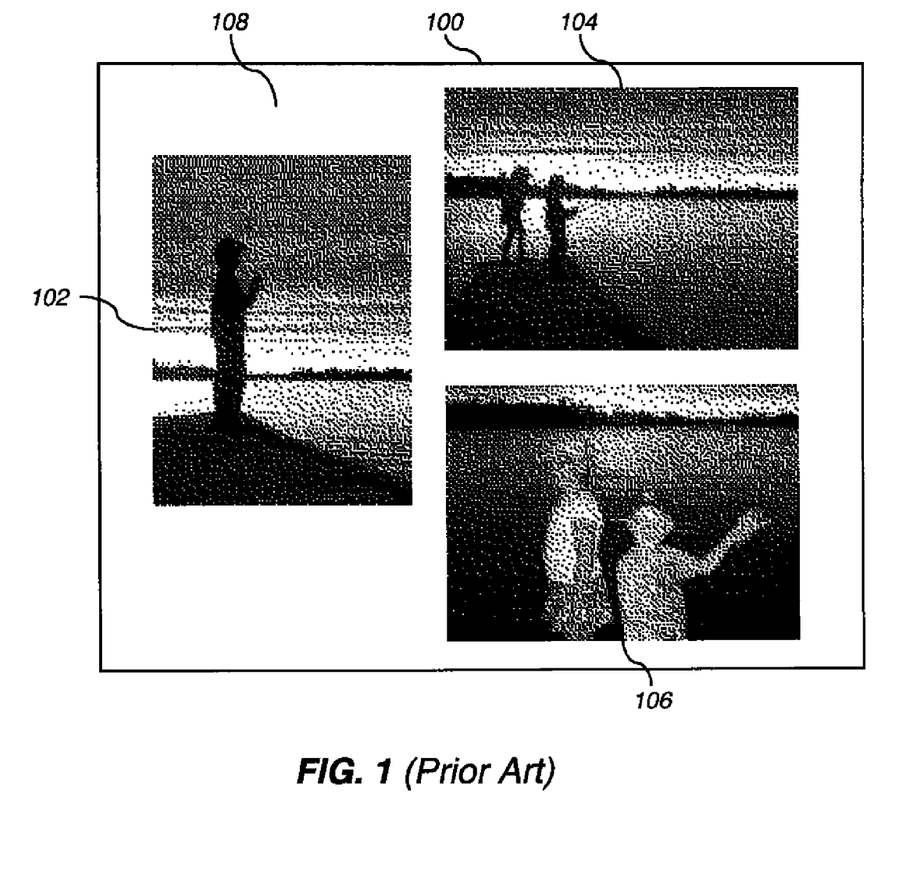
FIG. 1 illustrates a composite image formed using a group of digital images.

FIG. 1 shows an example of a composite image 100 created using three digital images 102, 104 and 106. The composite image 100 also includes a background 108. Digital imaging applications that can be used to form composite images 100 often provide the user with an ability to specify the content to be used for the background 108. Typically, the content for the background 108 can be selected from a menu of predefined backgrounds patterns. The predefined background patterns can include solid backgrounds having a variety of colors, or can include patterned backgrounds.

Users often find it difficult to find a background that they like from the set of predefined backgrounds. For example, the colors of the predefined backgrounds may not be compatible with the colors of the images that they wish to include in the composite image. Additionally, they may not want to repeatedly use the same backgrounds (e.g., for different pages in a photo book). As a result, there is a need for a method to provide custom backgrounds that can be used for a composite image.

U.S. Pat. No. 7,000,192 to Allen, entitled "Method of producing a matted image usable in a scrapbook," describes a method of producing a matted image usable in a scrapbook. The method comprises the steps of displaying a digital image having a matte area surrounding an image opening. A plurality of color selections from which a user can select a preferred color are provided and the selected color is used in the matte. The color selections can be obtained from an analysis of the digital image, thereby ensuring that the matte color matches a color from the digital image. However, simply selecting colors that occur frequently in an image can provide unacceptable results. For example, some colors may not be easily distinguishable to a viewer if they are part of a texture. Additionally, some colors may be found in image locations that do not complement a matte, or may correspond to colors that are unacceptable for a matte. While a user may choose a suitable color that overcomes these deficiencies, it is desirable to automate the color selection process to enable users to be efficient and effective.

It is known in the art to create color palettes by analyzing the colors in an image. Such color palettes can be used for purposes such as displaying digital images on color displays capable of representing only a limited number of colors (e.g., 256). For example, the article "A new approach to palette selection for color images" by Balasubramanian et al. (Journal Imaging Technology, Vol. 17, pp. 284-290, 1991) discloses a method for determining a palette of colors based on the distribution of colors in the input digital image. A similar method is disclosed in U.S. Pat. No. 6,859,210 to Luo et al., entitled "Method for representing a digital color image using a set of palette colors based on detected important colors." Such methods are also known to be useful for determining website color palettes.

U.S. Pat. No. 6,711,291 describes the use of colors found in an image to provide a textual caption with a selected color within the image. The selected color can be found within the image by forming a color histogram of the entire image. Colors within the histogram are then candidate colors. A candidate color having suitable contrast with the area in which the textual caption is to be placed is selected and the textual caption of the suitably-contrasting color combined with the image. However, this process can still yield undesirable results. A color found in the histogram at a high frequency may be, for example, part of a large textured area that includes multiple colors. Thus, the high-frequency color used in, for example, a matte, may not provide a pleasing combination, since the specific color within the textured area may not be readily apparent to a viewer.

There is a need therefore, for an improved method for providing a background to be used for forming a composite image, wherein the background is customized to be compatible with the images to be displayed in the composite image.

SUMMARY OF THE INVENTION

The present invention represents a method for displaying a group of digital images using a background corresponding to an image region selected from one of the digital images, comprising:

receiving a designation of the group of digital images to be displayed;

using a processor to automatically analyze the group of digital images to select an image region from one of the digital images that is appropriate to use as a background for a composite image, wherein the selected image region includes a plurality of image pixels;

forming a background from the selected image region;

forming the composite image including the background and at least one digital image from the group of digital images; and displaying the composite image.

This invention has the advantage that a composite image can be automatically formed using an aesthetically pleasing background that has improved viewer appeal relative to a conventional solid or patterned background.

It has the additional advantage that the background for the composite image contains content that is relevant to the collection of digital images and is compatible with the digital images that are displayed in the composite image.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein, that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The phrase, "digital image file", as used herein, refers to any digital image file, such as a digital still image or a digital video file.

Figure 2:
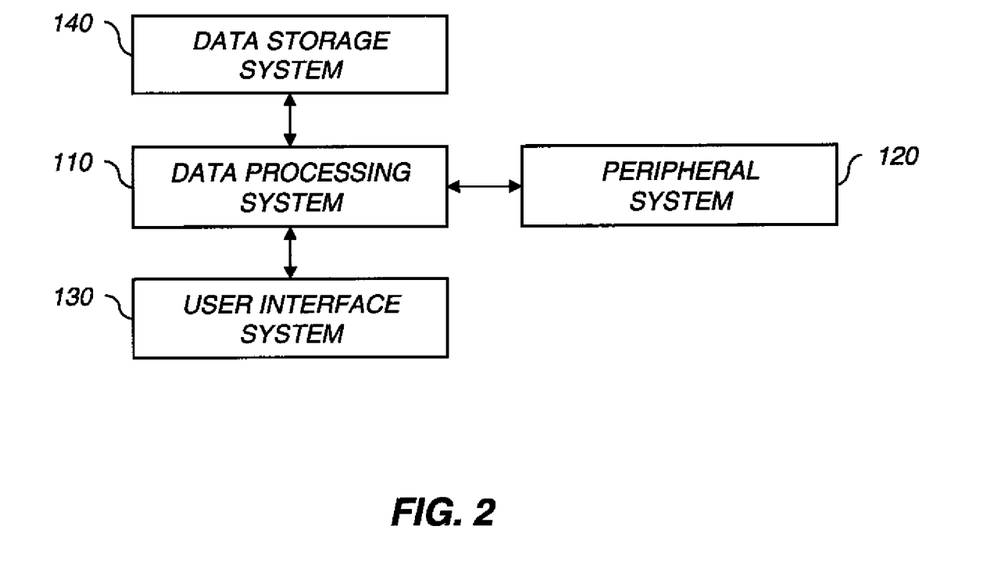
FIG. 2 is a high-level diagram showing the components of a system for displaying a group of digital images according to an embodiment of the present invention.

FIG. 2 is a high-level diagram showing the components of a system for displaying a group of digital images according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 2.

Commonly assigned, co-pending U.S. patent application Ser. No. 12/717,440, entitled: "Method for combining image and imaging product", by Cok et al., which is incorporated herein by reference, teaches a method for combining an image with an imaging-related product. The method involves analyzing the image to identify one or more of the image colors having a frequency of occurrence in the image high enough to be visible to an image observer. The imaging-related product is then formed using one or more of the identified high-frequency colors or using a color complementary to one or more of the identified high-frequency colors. In one embodiment, the imaging related product is a matte, which is used as a background for one or more images.

Preferably, the high-frequency colors selected according to the method of Cok et al. correspond to spatially coherent color clusters that occur in the image. In one embodiment, the spatially coherent color clusters are determined by measuring the spatial distance between pixels within the image that have similar colors. Similar colors can be determined by measuring differences in hue to form a color distance value. Threshold values are employed to define a minimum spatial cluster size and color variation (color distance) and groups of pixels meeting the threshold requirements are then determined. Typically, the minimum spatial cluster size is selected to be large enough to be readily perceived within an image at a suitable viewing distance.

While the method of Cok et al. can be used to choose backgrounds for composite images, they will be limited to a set of background styles having various predefined patterns. Inventors have observed that aesthetically pleasing composite images can be formed using custom backgrounds formed using image regions selected from one of the images in a group of digital images. This approach has the advantage that the resulting background is relevant to and compatible with the set of digital images being displayed in the composite image.

Figure 3:
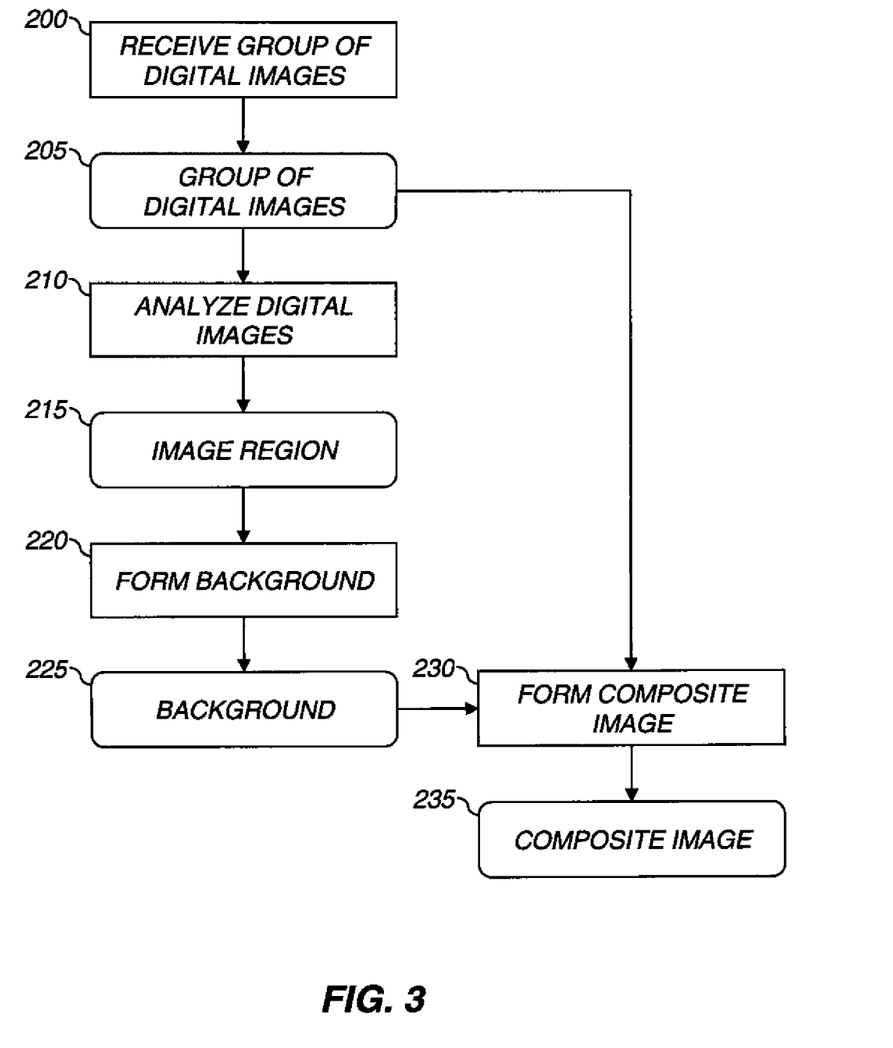
FIG. 3 is a flow chart illustrating a method for forming a composite image according to an embodiment of the present invention.

The present invention will now be described with reference to FIG. 3. A receive group of digital images step 200 receives a designation of a group of digital images 205. An analyze digital images step 210 automatically analyzes the group of digital images 205 to select an image region 215 from one of the digital images that is appropriate to use as a background 225 for a composite image 235. A form background step 220 is then used to form the background 225 from the selected image region 215. Finally, a form composite image step 230 is used to form the composite image 235 including the background 225, together with at least one digital image from the group of digital images 205.

Figure 4A:
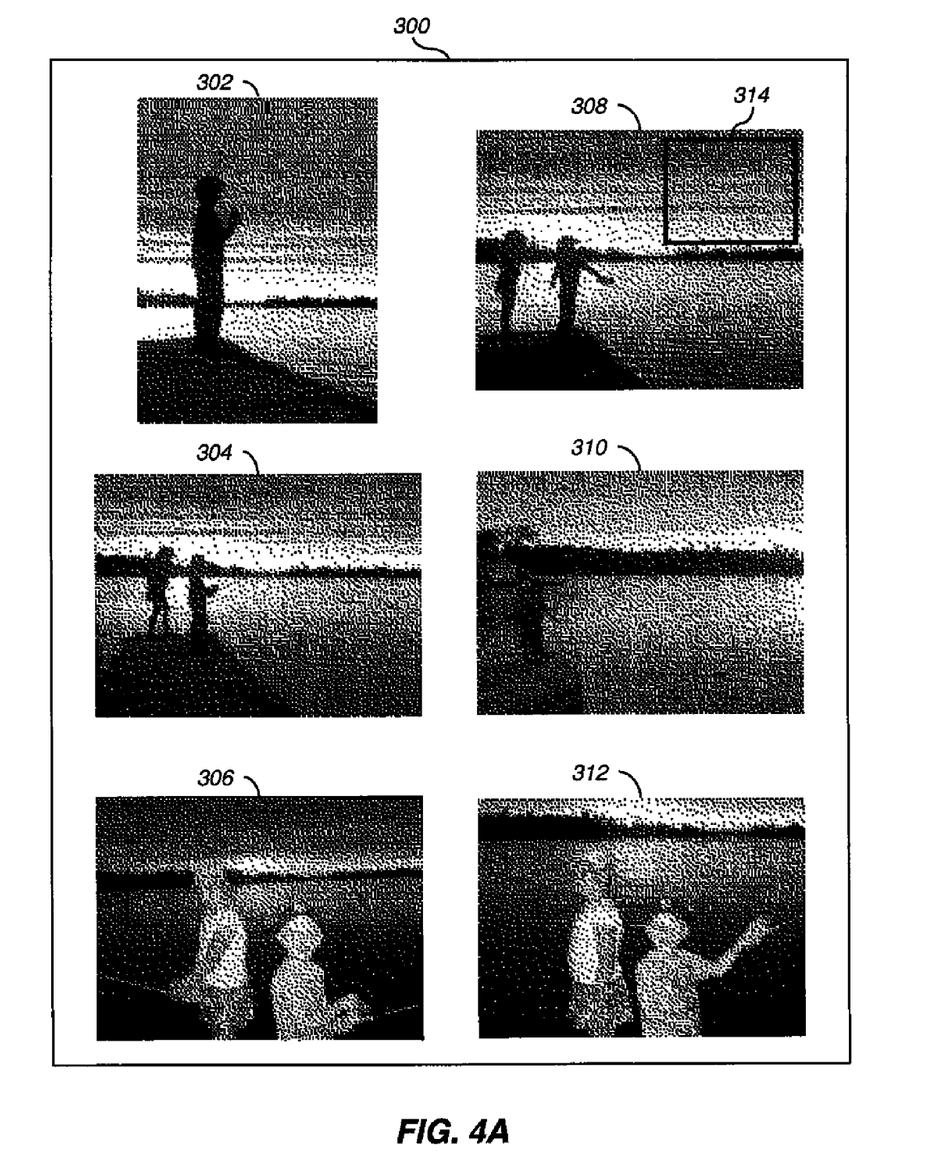
FIG. 4A illustrates a group of digital images.
Figure 4B:
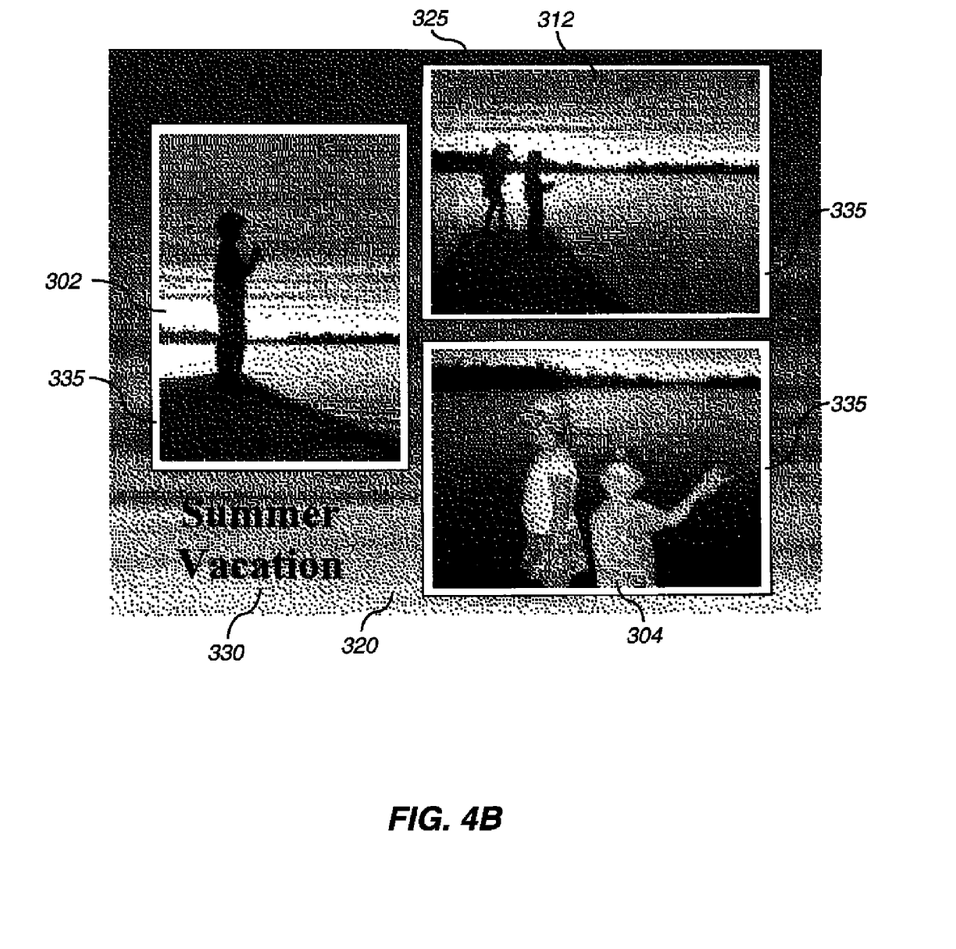
FIG. 4B illustrates a composite image formed according to an embodiment of the present invention.

FIG. 4A illustrates an example of a group of digital images 300 that can be used to form a composite image according to the method of the present invention. The group of digital images 300 includes six digital images 302, 304, 306, 308, 310 and 312. An image region 314 is identified from a digital image in the group of digital images 300 according to the analyze digital images step 210 (FIG. 2). In this example, the identified image region 314 corresponds to a sky region in digital image 308, which happens to be a sunset scene. As shown in FIG. 4B, the image region 314 from FIG. 4A is used to form a background 320 for a composite image 325 that includes three digital images 302, 304 and 312 from the group of digital images 300. The composite image 325 can also include other optional content elements such as text 330 and borders 335.

Each of the steps in the method of FIG. 3 will now be discussed in additional detail. There are many different ways different ways for designating a group of digital images 205 that are known to those in the art. Any such method can be used for the receive group of digital images step 200 in accordance with the present invention. For example, the present invention can be operated in the context of various imaging applications, such as an image editing application (e.g., ADOBE Photoshop), an image browsing application (e.g., KODAK EASYSHARE Software) or an image sharing website application (e.g., KODAK Gallery). Such imaging applications generally provide a means for a user to import a plurality of images into an image collection, or to navigate through a file system to view a collection of images stored in an image folder.

In some embodiments, an entire digital image collection can be used as the group of digital images 205. In this case, the background 225 can be formed with an image region 215 identified from a potentially large number of digital images. In other embodiments, a user interface can be provided in the imaging application to enable a user to designate a group of digital images 205 which is a subset of the digital image collection. For example, the user interface can enable the user to select a folder of digital images corresponding to a particular event or time period, or to designate a specific set of digital images that may be scattered throughout the collection.

In some embodiments, the group of digital images 205 can be the exact set of digital images that are to be included in the composite image 235. For example, a user can select a set of three images to be included on a particular album page of a photo album (e.g., a printed photo book or a softcopy photo album intended for viewing on a softcopy display). The set of three images can be used as the group of digital images such that a background for that album page will be formed using an image region 215 selected from one of the images that will be included on that album page.

In other cases, the group of digital images 205 can be a superset of the images that are to be included in the composite image. For example, a user can designate a set of digital images that will be used to create all of the album pages in a photo album. If this set of digital images is used as the group of digital images 205, then the background 225 used to form a composite image for a particular album page in the photo album may use an image region 215 selected from a digital image that is not included on that particular album page of the photo album, or, in some cases, is not even included on any album page of the photo album.

A digital image collection can include both digital still images (e.g., digital camera images or scans of photographic prints), as well as digital video sequences. The group of digital images 205 can include one or more digital images corresponding to frames selected from a digital video sequence. The frames can be selected automatically using a key-frame extraction algorithm, many of which are well-known in the art. Alternately, a user interface can be used to enable a user to manually designate one or more image frames to be included in the group of digital images. In other cases, an entire digital video sequences can be included in the group of digital images 205. This is particularly appropriate for forming a composite image 235 intended to be viewed on a softcopy display such that the composite image 235 can include digital video sequences that are played when the composite image 235 is viewed.

It will be obvious to one skilled in the art that a wide variety of different user interfaces can be used to designate the group of digital image 205. For example, the user can click on icons corresponding to the digital images, or can drag a bounding box around a set of icons, or can type in a set of file names.

In addition to imaging applications, the method of the present inventions can be practiced in the context of any other type of imaging system known in the art. For example, it can be practiced in an internal digital camera application, in a cell phone application or in an imaging kiosk.

The designation of the group of digital images 205 can be received in many different forms in accordance with the present invention. For example, in some embodiments the actual digital images are provided to the processor which will be used to implement the method of the present invention. In other embodiments, the group of digital images 205 can be provided as a list of file names, or a list of file identifiers indicating the location that the digital image files are stored. In still other embodiments, the group of digital images 205 can be designated by identifying a particular image collection, or a particular folder within an image collection, or by specifying a criteria that can be used to identify a subset of an image collection (e.g., digital images captured within a specified date range, or digital images of a particular event, or digital images containing a particular person).

There are a wide variety of methods that could be used to implement the analyze digital images step 210. The goal of this step is to identify an image region 215 that can be used to form the background 225. In a preferred embodiment, the analyze digital images step 210 is used to identify an image region 215 having relatively homogeneous texture characteristics, and having a distribution of colors that are compatible with the digital images that are to be used to form the composite image 235. If the image region 215 has strong edges or too much image detail or too much color variability, it could be distracting if it were used for a background of the composite image 235. Likewise, if the image region 215 has a color that clashes with dominant colors in the digital images that are to be used to form the composite image 235, then the resulting composite image 235 would not be visually appealing. Examples of typical image regions that could be used to make aesthetically pleasing backgrounds would include skies, grass, foliage, bodies of water and beaches.

The problem of identifying an image region that would be appropriate to use as a background for a composite image has a lot in common with the problem of identifying an "open region" in an image that could be used for purposes such as adding text to the image. Examples of such algorithms are described in commonly assigned U.S. Pat. No. 5,901,245 to Warnick et al., entitled "Method and system for detection and characterization of open space in digital images;" commonly assigned U.S. Pat. No. 6,115,717 to Mehrotra et al., entitled "System and method for open space metadata-based storage and retrieval of images in an image database;" and commonly assigned U.S. Pat. No. 6,711,291 to Stubler et al., entitled "Method for automatic text placement in digital images," all of which are incorporated herein by reference.

Figure 5:
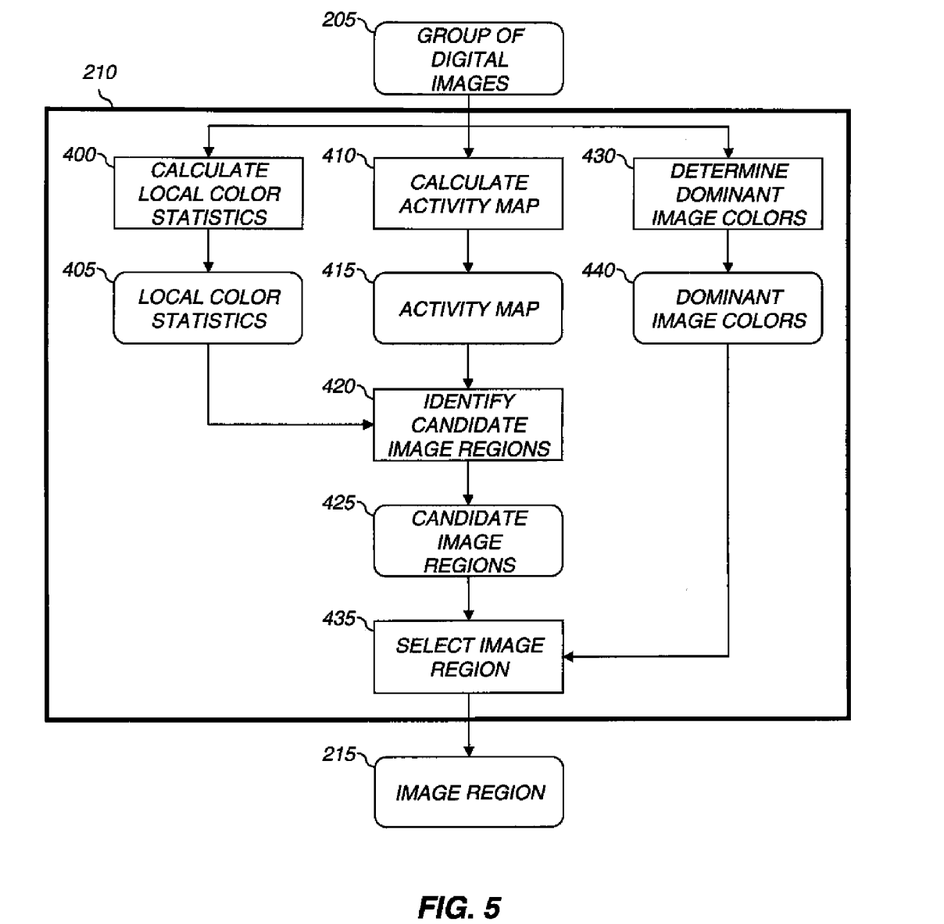
FIG. 5 illustrates additional details for the analyze digital images step in FIG. 3 according to one embodiment of the present invention.

In some embodiments of the present invention, the analyze digital images step 210 uses a method based on that described in the aforementioned U.S. Pat. No. 5,901,245. A flowchart illustrating one such method is illustrated in FIG. 5. A calculate activity map step 410 is used to determine an activity map 415 for each digital image in the group of digital images 205. The activity map 415 represents a measure of the activity/smoothness/homogeneity within the digital image. Any method known in the art can be used to determine the activity map 415, such as edge detection, local entropy measurement or local texture analysis. Examples of edge detection techniques that are well-known in the art include the user of a gradient detector, a Canny edge detector or a convolution process using a Sobel or Prewitt edge kernel. In some embodiments, the activity map is computed using a luminance image computed from the input digital image using methods known in the art.

An identify candidate image regions step 420 is used to identify one or more candidate image regions 425 from the digital images in the group of digital images 205 by analyzing the activity maps. In some embodiments, this process includes the steps of thresholding the activity map to identify image regions having an activity level below a threshold level. The threshold level can be a predetermined level corresponding to a maximum activity level that is determined to produce aesthetically pleasing backgrounds. Alternately, the threshold can be adaptively determined based on the distribution of activity levels in the activity maps 415. In some embodiments, it may also be desirable to define a minimum activity level as well as a maximum activity level. This can be used to avoid using a totally uniform image region for the background (e.g., a pure white region corresponding to a cloud-filled sky), since such areas may not produce aesthetically pleasing backgrounds.

For computational efficiency reasons, it may be desirable to compute the activity maps 415 using low-resolution version of the digital images. However, it will be necessary to preserve a minimum image size in order to be able to accurately estimate the image activity level.

After the activity map has been thresholded to identify low activity pixels, a second stage of processing can be applied to identify contiguous image regions of a minimum size where all of the pixels are classified as low activity pixels that could be used as candidate image regions 425. The minimum size is defined such that the candidate image regions are large enough to be used effectively to form a background (e.g., by resizing the image region or tiling the image region).

In some embodiments, it may also be desirable to use a calculate local color statistics step 400 to calculate local color statistics 405 for the digital images. In some embodiments, the local color statistics 405 represent an indication of the color constancy in the digital image. For example, the local color statistics 405 can be a map of color variances computed over local image neighborhoods. The identify candidate image regions step 420 can then determine candidate image regions 425 that are both low in activity as well as low in color variance.

The candidate image regions 425 will generally include image regions selected from a plurality of the digital images in the group of digital images 205. However, it may be the case that some of the digital images do not contain any image regions that are identified to be good candidates to be used as a background. If no acceptable candidate image regions 425 are identified, the identify candidate image regions step 420 can adjust its thresholds to the point where at least one candidate image region 425 is identified. Alternately, the user can be notified that no good background regions were identified and the user can be invited to designate additional digital images that can be evaluated.

Once a set of candidate image regions 425 has been identified, a select image region step 435 is used to select one of the candidate image regions 425 to be used as the image region 215. There are a wide variety of methods that can be used to select the most appropriate image region 215 from the set of candidate image regions 425. In a preferred embodiment, the candidate image regions 425 are ranked according to a specified criteria and the highest-ranked candidate image region can be automatically selected. In other embodiments, the candidate image regions 425 (or a plurality of highest-ranked candidate image regions) can be displayed to the user. The user can then select the image region 215 according to their preferences.

For the case where the select image region step 435 uses a ranking criteria to evaluate the candidate image regions 425, there are many different factors that could be used to define the ranking criteria. In some embodiments, the candidate image regions 425 can be evaluated to determine whether their color distributions are compatible with the dominant colors in the digital images that are to be included in the composite image 235. One way that this can be done is to use a determine dominant image colors step 430 to determine a set of dominant image colors 440 that occur within the digital images. In a preferred embodiment, the determine dominant image colors step 430 uses the method for determining spatially-coherent color clusters taught in the aforementioned U.S. patent application Ser. No. 12/717,440. The average color value within each cluster can then be identified to be a dominant image color 440. Dominant color values can also be determined for each of the candidate image regions 425. In a preferred embodiment, the average color value for a candidate image region 425 can be used as the dominant color value. The dominant image colors 440 can be compared to the average color values of the candidate image regions 425. Candidate image regions 425 having average color values whose hues are similar to, or complementary to, the dominant color values 440 can be assigned high rankings, otherwise they can be assigned low rankings. Quantitative ranking values can be determined which include a color ranking term& determined by computing weighted sums of the hue differences across all of the dominant image colors 440:

$$R_c = \left( \sum_i w_i \min(|H_a - H_{d,i}|, |H_a - H_{c,i}|) \right)^{-1} \quad (1)$$

where $H_a$ is the average hue for the candidate image region, $H_{d,i}$ is the hue of the $i^{th}$ dominant color, $H_{c,i}$ is the complementary hue to the $i^{th}$ dominant color, $w_i$ is a weighting value for the $i^{th}$ dominant color, and min(a,b) is an operator that returns the minimum of a and b. (In some embodiments, a complementary hue can be defined to be one which is on the opposite side of the hue circle.) In one embodiment, the weighting values $w_i$ are proportional to the number of pixels in the corresponding spatially-coherent color cluster.

The ranking value can also include other terms which relate to the desirability of a particular candidate image region. For example, the ranking value can include a term related to the average activity value in the candidate image region 425 or a term related to the average local color variability. In some cases, it can be useful to include a term that penalizes candidate image regions 425 that come from digital images that are going to be included in the composite image 235. Conversely, in other embodiments it can be useful to include a term that penalizes candidate image regions 425 that do not come from digital images that are going to be included in the composite image 235. It can also be useful to include a term that penalizes candidate image regions that have already been used for a background in another related composite image 235 (for example, for another page in a photo album).

In some embodiments, the select image region step 435 can be adapted to preferentially select an image region 215 having texture characteristics that are similar to the texture or color characteristics of image regions in a plurality of the digital images in the group of digital images. For example, if several of the digital images have a sunset sky region, it is likely that a sunset sky region would make a desirable background 225. In some embodiments, the average activity value can be used as a measure of the texture characteristics. However, any other means for quantifying texture characteristics known in the art can be used for this purpose. Likewise, the average color value can be used as a measure of the color characteristics. Alternatively, other quantities, such as the color variance, can also be considered.

The form background step 220 can use a number of different methods to form the background 225 from the selected image region 215. Typically, the composite image 235 is formed using a template which includes a background area and to be filled with the background 225 and one or more image areas, to be filled with digital images from the group of digital images 205. In a preferred embodiment, the image region 215 is resized to totally fill the size of the background area in the template. If the image region 215 does not have the same aspect ratio as the background area, then it may be necessary to crop the image region 215 to the aspect ratio of the background area. Alternately, different scale factors can be applied in the horizontal and vertical directions to adjust the aspect ratio accordingly. However, depending on the image content in the image region 215, this can result in noticeable distortion artifacts.

If the number of image pixels in the image region 215 is small relative to the size of the background area, a background 225 formed by simply resizing the image region 215 can suffer from quality artifacts arising from a lack of resolution. Such artifacts can be particularly problematic if the analyze digital images step 210 was not able to identify any large image regions that were appropriate to be used as backgrounds and had to settle for a smaller image region. To avoid such quality artifacts, the form background step 220 can utilize a tiling process to form the background 225. With this approach the background 225 is formed by splicing together multiple copies of the image region 215.

Figure 6:
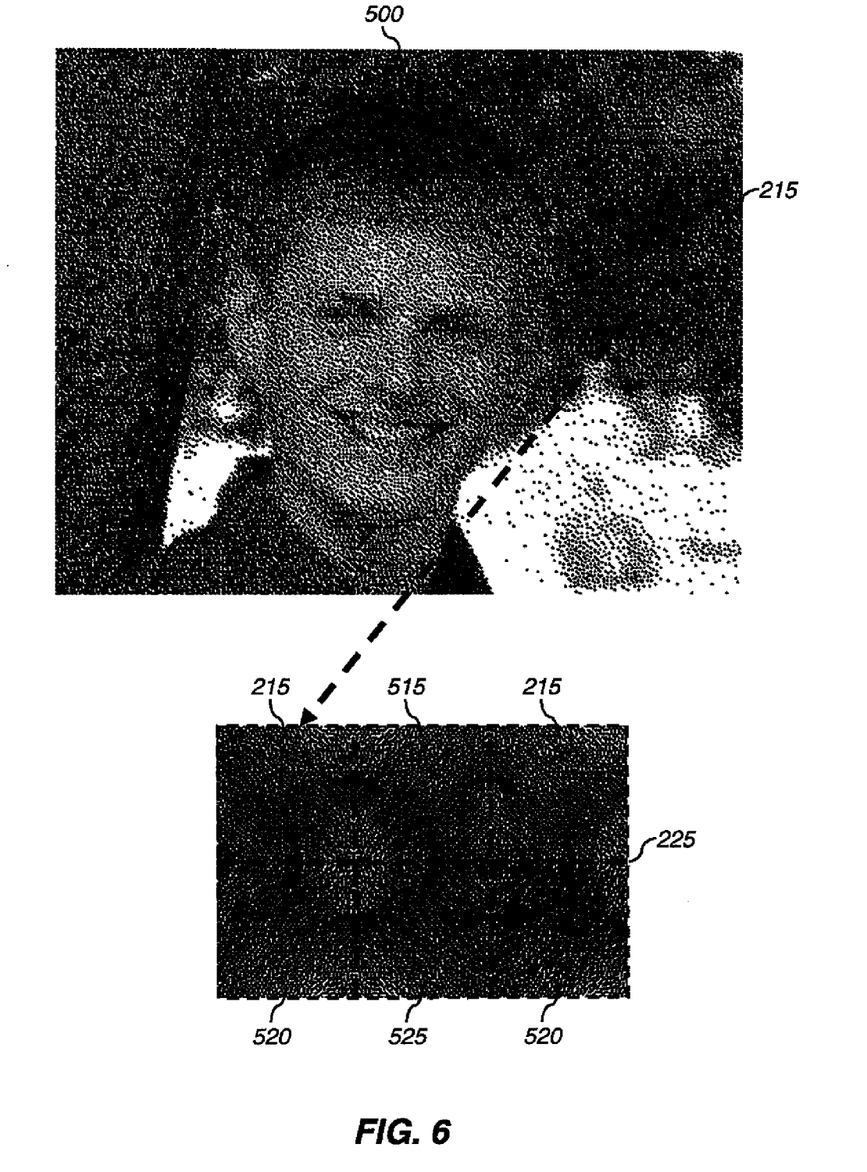
FIG. 6 illustrates the creation of a background by tiling an image region.

An example of using a tiling process for forming the background 225 is illustrated in FIG. 6. In this example, the analyze digital images step 210 (FIG. 3) identifies an image region 215 corresponding to a foliage region in a digital image 500. The background 225 is formed by tiling together 6 copies of the image region 215 in a 2×3 grid. To avoid artifacts at the tile boundaries where there is an abrupt change in the image signal, the image regions can be reflected across the tile boundaries. In this example, the image region 215 can be reflected horizontally to form a horizontally reflected image region 515. Similarly, the image region 215 can be reflected vertically to form a vertically reflected image region 520, and can be reflected both horizontally and vertically to form a horizontally and vertically reflected image region 525. In some embodiments, the tiling process can be combined with a resizing/cropping process to form the background 225 such that the set of tiled image regions are resized to further increase the size of the background 225 to fill the background region.

The form background step 220 can also apply one or more image processing operations to modify the image region 215 during the process of forming the background 225. For example, the tone scale of the image region 215 can be modified by applying a contrast adjustment tone scale transform or a brightness adjustment tone scale transform. This can be done automatically, or can be done according to user-specified preferences to alter the appearance of the background 225 (e.g., to produce a more subtle contrast).

Similarly, a color transformation can also be applied to the image region 215. This can be desirable to apply various special affects. For example, grayscale color transform can be used to form a grayscale background, a sepia color transform can be used to form a sepia tone background, a color balance transform to alter the color balance of the background, or a saturation boosting/reducing color transform can be used to alter the color saturation.

Various image processing operations can also be used to modify the image structure of the image region 215. For example, a blurring transform, a sharpening transform or a texture modification transform can be applied. Various special effects transforms can also be applied to the image region 215. A wide variety of special effects transforms are known in the art such as those available in the well-known ADOBE Photoshop software (e.g., "Emboss," "Extrude," and "Crystallize").

In some embodiments, a user interface can be provided to enable the user to specify what types of image processing operations should be applied to the image regions 215. Preferably, a provision can be made for the user to preview what the composite image 235 would look like if the specified image processing operations are applied.

In some embodiments of the present invention, the composite image 235 can be used as an album page in a photo album. For example, the photo album can be a printed photo book. Alternately, the photo album can be a softcopy photo album intended for viewing on a softcopy display. Softcopy photo albums can include both still images as well as digital video sequences.

In other cases, the composite image 235 can be a photo collage. The photo collage can be printed so that it can be displayed in a home (e.g., in a picture frame) or can be inserted into a photo album. In other cases, the photo collage can be a saved in a digital form (e.g., in the form of a JPG image file or a PDF document). The composite image can then be viewed by a user on a softcopy display. For example, the composite image can be displayed using image sharing software running on a computer, or can be displayed on a digital picture frame. In some embodiments, the digital composite image may be created in real time and saved for only as long as it is takes to display it. In other cases, the digital composite image may be archived so that it can be displayed at a later time.

The composite image 235 can also be used to form a wide variety of photo products. For example, the composite image 235 can be used as part of a photo calendar, or can be printed onto various novelty items such as mugs, mouse pads and T-shirts.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

100 composite image
102 digital image
104 digital image
106 digital image
108 background
110 data processing system
120 peripheral system
130 user interface system
140 data storage system
200 receive group of digital images step
205 group of digital images
210 analyze digital images step
215 image region
220 form background step
225 background
230 form composite image step
235 composite image
300 group of digital images
302 digital image
304 digital image
306 digital image
308 digital image
310 digital image
312 digital image
314 image region
320 background
325 composite image
330 text
335 border
400 calculate local color statistics step
405 local color statistics
410 calculate activity map step
415 activity map
420 identify candidate image regions step
425 candidate image regions
430 determine dominant image colors step
435 select image region step
440 dominant image colors
500 digital image
515 horizontally reflected image region
520 vertically reflected image region
525 horizontally and vertically reflected image region

The invention claimed is:

1. A method for displaying a group of digital images using a background corresponding to an image region selected from one of the digital images, comprising:
   receiving a designation of the group of digital images;
   using a processor to automatically analyze the group of digital images to select an image region from one of the digital images that is appropriate to use as a background for a composite image, wherein the selected image region includes a plurality of image pixels;
   defining a background region for the composite image;
   forming a background from the selected image region, wherein the formation of the background includes resizing, cropping or tiling the selected image region to fill the background region; and
   forming the composite image by placing the formed background into the background region and placing at least one digital image from the group of digital images over the formed background; and
   displaying the composite image.

2. The method of claim 1 wherein the automatic analysis is used to identify image regions having homogeneous texture characteristics.

3. The method of claim 1 wherein the automatic analysis is used to identify image regions having texture or color characteristics that are similar to the texture or color characteristics of image regions in a plurality of the digital images.

4. The method of claim 1 wherein the automatic analysis preferentially selects image regions having a dominant color that is similar to or complementary to dominant colors in the group of digital images.

5. The method of claim 1 wherein the automatic analysis automatically identifies a plurality of candidate image regions, and wherein the candidate image regions are presented to a user for selection of the image region.

6. The method of claim 1 further including modifying the tone scale, the color or the image structure of the identified image region prior to using it as the background.

7. The method of claim 6 wherein the tone scale of the identified image region is modified by applying a contrast adjustment tone scale transform or a brightness adjustment tone scale transform.

8. The method of claim 6 wherein the color of the identified image region is modified by applying a grayscale color transform, a sepia color transform, a color balance transform, a saturation boosting color transform or a saturation reduction color transform.

9. The method of claim 6 wherein the image structure of the identified image region is modified by blurring the image region, sharpening the image region or modifying the texture to the image region.

10. The method of claim 1 further including applying a special effect transform to the identified image region prior to using it as the background.

11. The method of claim 1 wherein the image region is selected from one of the digital images included in the composite image.

12. The method of claim 1 wherein the composite image includes all of the images in the group of digital images.

13. The method of claim 1 wherein the composite image is an album page.

14. The method of claim 10 wherein the album page is used in a printed photo album.

15. The method of claim 10 wherein the album page is displayed in a softcopy photo album on a softcopy display.

16. The method of claim 1 wherein the composite image is a photo collage.

17. The method of claim 1 wherein the composite image is displayed using image sharing software.

18. The method of claim 1 wherein at least one of the digital images is a frame from a digital video sequence.

19. The method of claim 1 wherein at least one of the digital images is a digital video sequence.

20. The method of claim 1 wherein at least one of the digital images is a scan of photographic print.

21. A system comprising:
a data processing system; and
a memory system communicatively connected to the data processing system and storing instructions configured to cause the data processing system to implement a method for forming a composite image from a group of digital images using a background corresponding to an image region selected from one of the digital images, wherein the instructions comprise:
receiving a designation of the group of digital images to be displayed;
using a processor to automatically analyze the group of digital images to select an image region from one of the digital images that is appropriate to use as a background for the composite image, wherein the selected image region includes a plurality of image pixels;
defining a background region for the composite image;
forming a background from the selected image region, wherein the formation of the background includes resizing, cropping or tiling the selected image region to fill the background region; and
forming the composite image by placing at least one digital image from the group of digital images over the formed background.

22. A computer program stored on a non-transitory tangible computer readable storage medium for forming a composite image from a group of digital images using a background corresponding to an image region selected from one of the digital images comprising an executable software application for causing a data processing system to perform the steps of:
receiving a designation of the group of digital images to be displayed;
using a processor to automatically analyze the group of digital images to select an image region from one of the digital images that is appropriate to use as a background for the composite image, wherein the selected image region includes a plurality of image pixels;
defining a background region for the composite image;
forming a background from the selected image region, wherein the formation of the background includes resizing, cropping or tiling the selected image region to fill the background region; and
forming the composite image by placing at least one digital image from the group of digital images over the formed background.

* * * * *